United States Patent
Zhou et al.

(10) Patent No.: US 8,587,861 B1
(45) Date of Patent: Nov. 19, 2013

(54) MAKING A CROSS-LINKED POLYMER NETWORK

(75) Inventors: Zhang-Lin Zhou, Palo Alto, CA (US); Alexandre M Bratkovski, Mountain View, CA (US); Shih-Yuan Wang, Palo Alto, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/551,373

(22) Filed: Jul. 17, 2012

(51) Int. Cl.
- G02F 1/00 (2006.01)
- H01L 51/00 (2006.01)
- C08J 7/06 (2006.01)
- H01L 21/00 (2006.01)

(52) U.S. Cl.
USPC ............ 359/321; 257/40; 427/487; 428/466; 525/55

(58) Field of Classification Search
CPC .... C08F 220/18; C08F 220/68; G02F 1/3611; G02F 1/3612; H01L 51/0039; H01L 51/0043; H01L 51/56
USPC ............... 252/582, 586; 257/40; 359/321; 427/487, 493, 508; 248/67, 446; 438/48, 57, 73; 525/55
See application file for complete search history.

(56) References Cited

U.S. PATENT DOCUMENTS

| | | | |
|---|---|---|---|
| 6,228,977 B1 | 5/2001 | Kanitz et al. | |
| 6,781,663 B2 | 8/2004 | Freeman | |
| 8,003,980 B2 * | 8/2011 | Sheng et al. | 257/40 |
| 2011/0164301 A1 | 7/2011 | Paolini, Jr. et al. | |
| 2012/0018716 A1 * | 1/2012 | Zhao et al. | 257/40 |

OTHER PUBLICATIONS

Chen, C. et al., UV Curable Electro-optic Polymer Switch Based on Direct Photodefinition Technique, Quantum Electronics, IEEE Journal of, Jul. 2011, pp. 959-964, vol. 47, No. 7.

Luo. J. et al., Tailored Organic Electro-optic Materials and Their Hybrid Systems for Device Applications, Chemistry of Materials American Chemical Society.

Shi, Z. et al., Achieving Excellent Electro-optic Activity & Thermal Stability in Poled Polymers Through an Expeditious Crosslinking Process, J.of Mat.Chem, Nov. 15, 2011, pp. 951-959.

Tang, H. et al., Novel Poling and Electro-optic Measurement Methods of Cladded Nonlinear-optical Polymer Films, (Research Paper), SPIE, vol. 3147.

* cited by examiner

Primary Examiner — David N Spector

(57) ABSTRACT

A method for making a cross-linked polymer network is disclosed herein. A mixture is formed of i) an electro-optic chromophore, ii) any of a cross-linkable monomer or a cross-linkable oligomer, and iii) an initiator in a solvent. Poling of the electro-optic chromophore is initiated by exposing the mixture to an electric field. While the mixture is being exposed to the electric field, the mixture is subjected to ultraviolet light or heat to initiate cross-linking of the any of the cross-linkable monomer or the cross-linkable oligomer to form a matrix of the cross-linked polymer network.

18 Claims, 4 Drawing Sheets

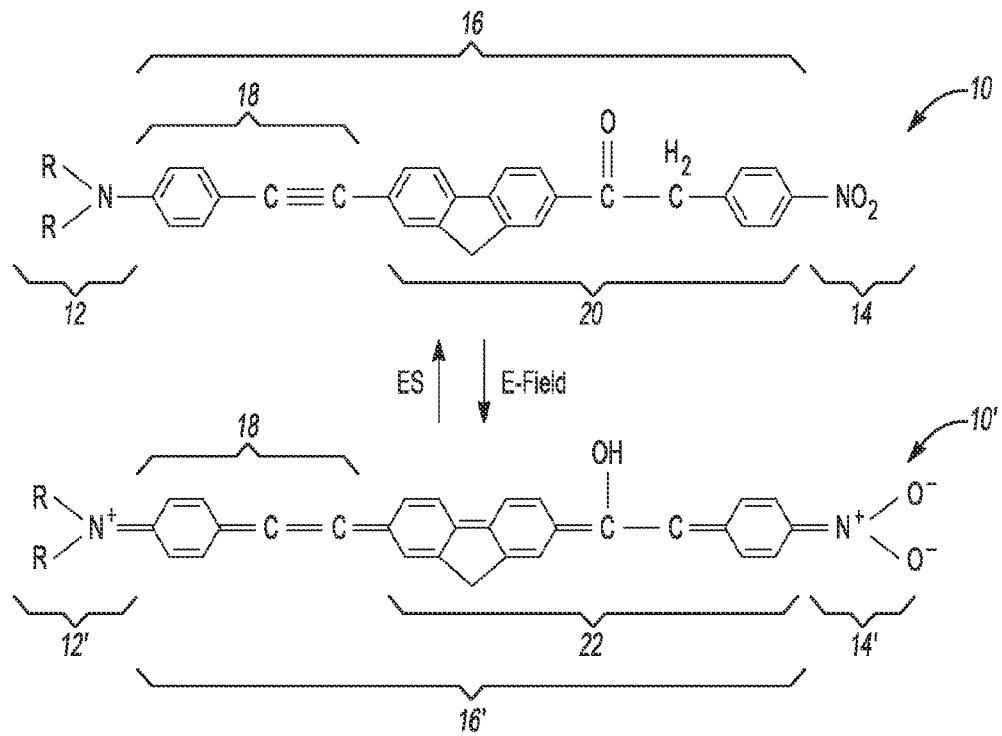
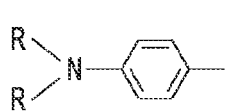
Fig-4A
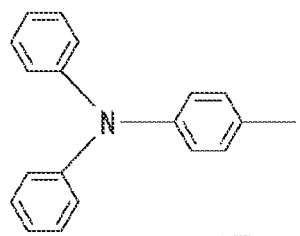
Fig-4B
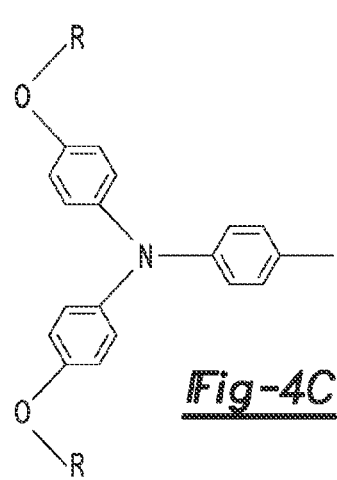
Fig-4C
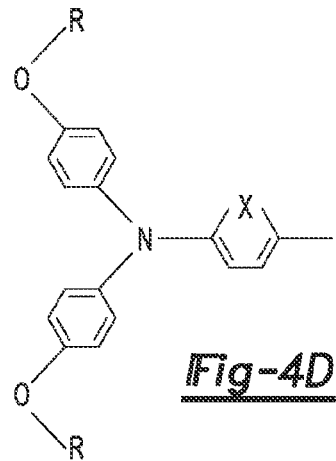
Fig-4D

MAKING A CROSS-LINKED POLYMER NETWORK

BACKGROUND

Electro-optic materials may be suitable for use in a number of devices and/or systems that include both optical and electrical components. The use of electro-optic materials may contribute to a reduction in optical loss and an improvement of thermal and photochemical stability of the device and/or system. In many instances, the electro-optic material is in intimate contact with one or more of the optical and/or electric components. Examples of devices and/or systems that may include electro-optic materials are optical interconnects, waveguides, complementary metal-oxide-semiconductor (CMOS) chips, resonator modulators, displays, etc.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a structural formula of an example of the electro-optic chromophore both in the OFF state and the ON state;

FIGS. 4A through 4D are structural formulas of different examples of electron donors;

DETAILED DESCRIPTION

The present disclosure relates generally to methods for making a cross-linked polymer network. The cross-linked polymer network disclosed herein includes a cross-linked polymer matrix and polarized electro-optic chromophore(s) located within and distributed throughout the cross-linked polymer matrix. The method for making examples of the cross-linked polymer network involves poling the electro-optic chromophore(s) that are present in a mixture with cross-linkable monomer(s) and/or oligomer(s). After poling has been initiated but while poling is continued, the monomer(s) and/or oligomer(s) within the mixture are cross-linked to form the cross-linked polymer matrix. Examples of the method disclosed herein enable the electro-optic chromophore(s) to become uniformly distributed inside of the formed cross-linked polymer matrix. By "uniformly distributed", it is meant that the chromophore(s) are spread throughout the length and/or width of the cross-linked polymer matrix and do not form aggregates. Additionally, examples of the method disclosed herein result in the immersion/embedment of the polarized electro-optic chromophore(s) within the cross-linked polymer matrix. It is believed that the cross-linked polymer network is robust, stable, and a high performance electro-optical material.

By "high performance electro-optical material", it is meant that a linear Pockels EO effect tensor (i.e., an electro-optical coefficient), $r_{33}$, of the electro-optic chromophore in the cross-linked polymer network is in excess of 300 pm/V. The cross-linked polymer network disclosed herein may be particularly useful in hybrid electrical and optical devices and/or systems, such as organic light emitting devices (OLED) and organic photo-conductor (OPC) coatings. The dominant element of the linear Pockels EO effect tensor for any electro-optic chromophore denotes the magnitude of phase (refractive index, $\Delta\eta$) shift obtained for an applied low-frequency electric field. In order to achieve a large $r_{33}$, value, high microscopic nonlinearity is generally accompanied by high acentric chromophore order. The method(s) disclosed herein induce chromophore order without utilizing heating during poling and without self-assembly methods that exploit either ionic (Langmuir-Blodgett) or covalent (Merrifield) spatially anisotropic interactions.

Figure 1:
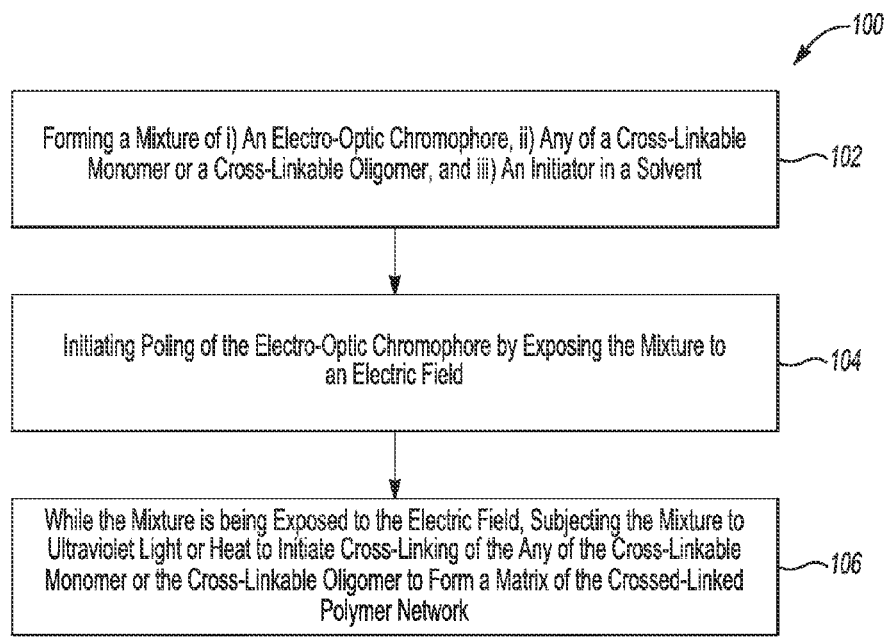
FIG. 1 is a flow diagram depicting an example of a method for making a cross-linked polymer network.

Referring now to FIG. 1, an example of a method for making the cross-linked polymer network is depicted. The method is generally depicted as reference numeral 100.

This example of the method 100 includes forming a mixture of i) an electro-optic chromophore, ii) any of a cross-linkable monomer or a cross-linkable oligomer, and iii) an initiator in a solvent, as shown at reference numeral 102. To form the mixture, the electro-optic chromophore, the cross-linkable monomer and/or the cross-linkable oligomer, and the initiator are combined in suitable amounts in a common solvent. In an example, the common solvent is capable of dissolving each of the selected electro-optic chromophore, cross-linkable monomer and/or cross-linkable oligomer, and initiator. As such, in this example, the mixture is a liquid solution. In another example, the common solvent is capable of dissolving each of the selected cross-linkable monomer and/or the cross-linkable oligomer and the initiator, and is capable of dispersing the selected electro-optic chromophore. As such, in this example, the mixture is a liquid dispersion having swelled electro-optic chromophore(s) therein. The solvent selected will depend, at least in part, upon the electro-optic chromophore, the cross-linkable monomer and/or the cross-linkable oligomer, and the initiator to be used. Examples of suitable solvents include organic solvents, such as benzene, chloroform, dimethylformamide (DMF), ethanol, 1-fluoropropanol, 2,2,3,3,4,4,4-heptafluorobutanol, hexafluoroisopropanol, isopropanol, methanol, pentafluoro-1-propanol, tetrahydrofuran (THF), trifluoroethanol, toluene, xylenes, and the like. The amount of solvent may vary, depending upon the amounts of the other components of the mixture. Generally, the solvent makes up a balance of the mixture, up to, for example, 100 wt %.

The electro-optic chromophore may be a nonlinear optically active molecular unit. Many of these units may be combined to create a bulk material. The electro-optic chromophore may be any nonlinear optically active molecular unit having extended π-electron conjugation in which the delocalized electron density may be polarized in response to an applied electric field.

Figure 2:
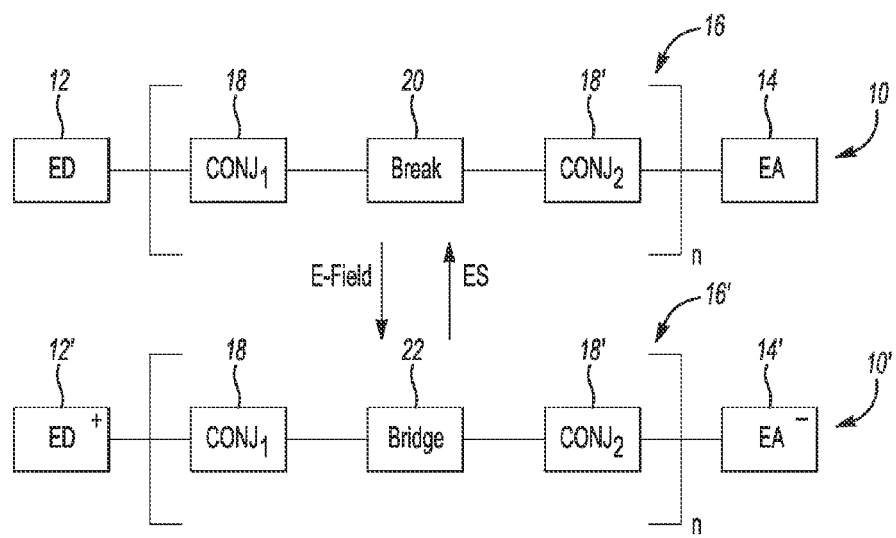
FIG. 2 is a schematic illustration depicting an electro-optic chromophore both in an OFF state and an ON state.
Figure 5A:
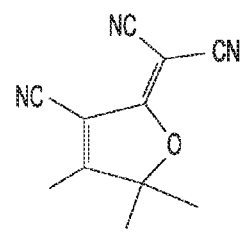
FIGS. 5A through 5F are structural formulas of different examples of electron acceptors.
Figure 5B:
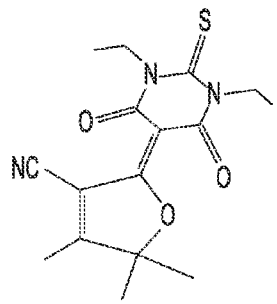
Figure 5C:
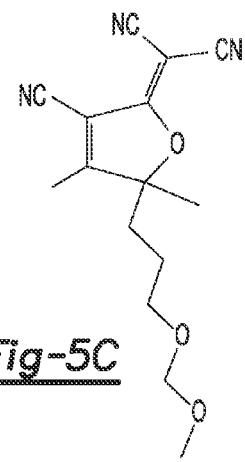
Figure 5D:
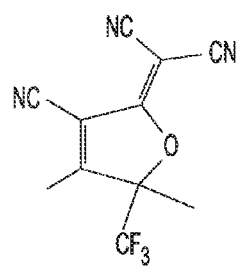
Figure 5E:
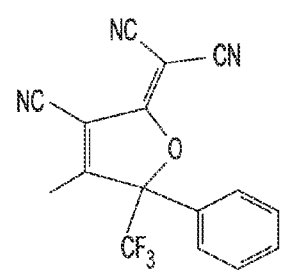
Figure 5F:
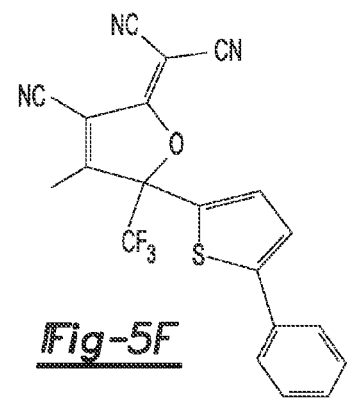

An example of the general structure of the electro-optic chromophore is shown in FIG. 2. In FIG. 2, the electro-optic chromophore in the OFF (non-polarized) state is labeled 10, and the electro-optic chromophore in the ON (polarized) state is labeled 10'. As depicted in FIG. 2, the electro-optic chromophore 10, 10' may include an electron donor ED, 12

(which is referred to as a positively charged group 12' in the ON state) and an electron acceptor EA, 14 (which is referred to as a negatively charged group 14' in the ON state), separated by a conjugating group 16, which may include any number of conjugating units $CONJ_1$, 18, or $CONJ_1$, 18 and $CONJ_2$, 18'. In some examples, the conjugating group 16 may include a single conjugating unit 18 (see FIG. 3). In the general structure, "n" is any integer greater than zero. The conjugation length of the electro-optic chromophore 10, 10' may be controlled by adjusting "n", where a larger number "n" results in a longer conjugation length. In some examples, "n" ranges from 1 to 5000, and in some other examples, "n" ranges from 1 to 500.

When the electro-optic chromophore 10' is in the OFF state, the conjugation within the conjugating group 16 is broken by a break unit 20 (i.e., an opaque barrier for electron tunneling). As such, in the OFF state, the electro-optic chromophore 10' is not fully conjugated.

Subjecting the electro-optic chromophore 10 in the OFF state to an electric field (i.e., e-field) induces polarization of the electro-optic chromophore 10 to form the electro-optic chromophore 10'. The excitable electro-optic chromophore 10 becomes fully conjugated under the influence of the e-field, and the break unit 20 is eliminated. The conjugating group 16 is capable of forming a planar conjugated bridge 22 (i.e., a π-bond bridge) between the now negatively charged group EA⁻, 14' and the now positively charged group ED⁺, 12'. The π-bond bridge 22 between the positively charged group and negatively charged group 12', 14' allows an intramolecular charge transfer to take place, such that at least one of: π-electrons or non-bonding electrons are delocalized throughout the electro-optic chromophore 10'. In this state, the charge transfers between the negatively charged group EA⁻, 14' and the positively charged group ED⁺, 12' allow electro-optic chromophore 10' to reach its maximum polarization.

As shown in FIG. 2, the conjugation of the electro-optic chromophore 10, 10' may be reversible, and thus the electro-optic chromophore may be switched between the ON (polarized) state and the OFF (non-polarized) state. When it is desirable to switch to the OFF state from the ON state, the electro-optic chromophore 10' may be exposed to an external stimulus, such as light, heat, chemical(s), or electrical current. It is to be understood that in the examples of the cross-linked polymer network disclosed herein, the polarized electro-optic chromophore 10' are fixed in the cross-linked polymer matrix and thus are not reversible. In other words, the orientation of the electro-optic chromophore(s) 10' is spatially fixed within respect to the cross-linked polymer matrix.

Referring now to FIG. 3, an example of the electro-optic chromophore 10, 10' is depicted. The electro-optic chromophore 10 is in the OFF state, and the electro-optic chromophore 10' is in the ON state. As illustrated in the structural formula of the electro-optic chromophore 10 in the OFF state,

is the electron donor 12 (where R may be H, or any alkyl group, such as a methyl group, an ethyl group, a propyl group, an isopropyl group, a butyl group, an isobutyl group, a tert-butyl group, etc., or any phenyl alkyl group, such as a phenylmethyl group, a phenylethyl group, a phenylpropyl group, etc.),

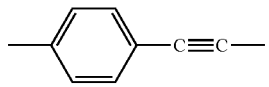

is the conjugating unit 18, —$NO_2$ is the electron acceptor 14, and

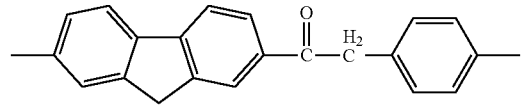

is the break unit 20. As illustrated in the structural formula of the electro-optic chromophore 10' in the ON state, the π-electrons or non-bonding electrons are delocalized throughout the chromophore. More specifically,

is the positively charged group 12',

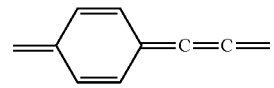

is the conjugating unit 18,

is the negatively charged group 14', and

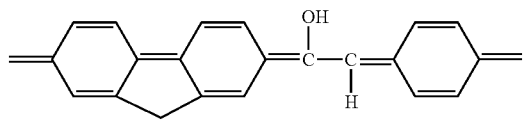

is the bridge unit 22.

While one example of the electro-optic chromophore 10, 10' is shown in FIG. 3, it is to be understood that the electro-optic chromophore 10, 10' may include other electron donors 12, other electron acceptors 14, other conjugating units 18 or 18 and 18', and other break and bridge units 20, 22. Examples of other conjugating units 18, 18' include —C=C—, —C≡C—, —C=N—, —N=N—, or any larger group that includes one of these groups. Examples of other suitable break units 20 include a —C(=S)— group, a carbazole unit, etc.

The first hyperpolarizability (i.e., first order hyperpolarizability or molecular first hyperpolarizability) $\beta_{zzz}(\omega,\epsilon)$ is a measure of how easily a dipole is induced in a molecule (e.g., electro-optic chromophore(s)) in the presence of an electric field. β is the first derivative of polarizability with respect to the field, zzz is the component of third-rank hyperpolarization tensor $\beta_{ijk}$ with the z-axis along the molecule, $\omega$ is the optical frequency, and $\epsilon$ is the dielectric permittivity. The optimization of the first hyperpolarizability, and thus of the dipolar electro-optic chromophores 10, 10', relies, at least in part, on tuning of the electron density distribution through chemical modification of molecular constituents. Ground-state electron density asymmetry, which is necessary for $\beta_{zzz}(\omega,\epsilon)$, may be induced through the asymmetric substitution of the $\pi$-electron-conjugated bridge 22 with the appropriate donors 12 and acceptors 14. Stronger donors 12 and acceptors 14, in combination with longer conjugating groups 16 (i.e., higher values of "n"), result in a reduced HOMO-LUMO energy gap and an optical absorption shifted toward longer wavelengths and lower frequencies.

Examples of other suitable electron donors 12 are shown in FIGS. 4A through 4D. In FIGS. 4A, 4C, and 4D, R may independently be selected from H, H, or any alkyl group, such as a methyl group, an ethyl group, a propyl group, an isopropyl group, a butyl group, an isobutyl group, a tert-butyl group, etc., or any phenyl alkyl group, such as a phenylmethyl group, a phenylethyl group, a phenylpropyl group, etc. In FIG. 4D, X is S or N.

Examples of other suitable electron acceptors 14 are shown in FIGS. 5A through 5F.

In the examples disclosed herein, it is to be understood that polymerizable functional groups are not added/introduced to the electro-optic chromophore 10, 10'. As such, in some instances, the electro-optic chromophore 10, 10' does not participate in polymerization or cross-linking. Rather, the polarized electro-optic chromophore 10' is immersed in the cross-linked polymer matrix that is formed via the method(s) disclosed herein.

Referring back to FIG. 1, the mixture may include, among the other mentioned components, the electro-optic chromophore 10, 10'. It is to be understood that the electro-optic chromophore 10 in the OFF state may be added to the mixture (i.e., the solution or dispersion previously described). Any desirable amount of electro-optic chromophore 10 may be added to the mixture. In an example, the amount of the electro-optic chromophore 10 ranges from about 1 wt % to about 50 wt % of the total wt % of the mixture. In another example, the amount of the electro-optic chromophore 10 ranges from about 5 wt % to about 20 wt % of the total wt % of the mixture.

The mixture may also include the cross-linkable monomer and/or the cross-linkable oligomer. The selected monomer(s) and/or oligomer(s) are at least able to be cross-linked (where cross-linking is initiated via exposure to appropriate energy), and are either photo curable or thermally curable. The monomer(s) and/or oligomer(s) may be monofunctional or polyfunctional/multifunctional (e.g., bifunctional, trifunctional, etc.). In some instances, the monomer(s) and/or oligomer(s) may be 2-branch, 3-branch, or 4-branch cross-linkers. It may be desirable to utilize 3-branch or 4-branch cross-linkers in order to increase the cross-linking density. The monomer(s) and/or oligomer(s) disclosed herein are also polymer precursors that polymerize in addition to cross-link. In other words, the monomer(s) and/or oligomer(s) may include polymerizable moieties or functional groups that are capable of being polymerized.

General examples of suitable monomer(s) and/or oligomer(s) include acrylates, methacrylates, styrenes, or isocyanates.

Examples of suitable multifunctional acrylates include diacrylates, triacrylates, tetraacrylates, etc. Suitable diacrylates include, for example, propoxylated neopentyl glycol diacrylate (NPGPODA, an example of which is SR 9003 from Sartomer Co., Inc., Exton Pa.), 1,6-hexanediol diacrylate (an example of which is SR 238 from Sartomer Co., Inc.), tripropylene glycol diacrylate, dipropylene glycol diacrylate, aliphatic diacrylate oligomer (an example of which is CN132 from Sartomer Co., Inc.), and aliphatic urethane diacrylate (an example of which is CN981 from Sartomer Co., Inc.). Suitable triacrylate or higher functionality monomer(s) or oligomer(s) include amine-modified polyether acrylates (examples of which are available as LAROMER® PO 83 F, LAROMER® LR 8869, and LAROMER® LR 8889, from BASF Corp., Florham Park, N.J.), trimethylolpropane triacrylate (an example of which is SR 351 from Sartomer Co., Inc.), tris(2-hydroxy ethyl)isocyanurate triacrylate (an example of which is SR368 from Sartomer Co., Inc.), dipentaerythritol penta-/hexa-acrylate, pentaerythritol tetraacrylate (an example of which is SR 295 from Sartomer Co., Inc.), ethoxylated (4)pentaerythritol tetraacrylate (an example of which is SR 494 from Sartomer Co., Inc.), and dipentaerythritol pentaacrylate (an example of which is SR 399 from Sartomer Co., Inc.), or mixtures thereof. Still other examples of suitable acrylate monomer(s) or oligomer(s) include chlorinated polyester acrylates (an examples of which are CN2201, CN736, and CN738 from Sartomer Co., Inc.), amine-modified epoxy acrylates, aromatic urethane acrylates (examples of which are CN9167US, CN9782, CN9783, CN992, CN999, CN9027, and CN997 from Sartomer Co., Inc.), and/or polyurethane acrylates (an example of which is LAROMER® LR 8949 from BASF, Corp.).

Other suitable oligomer(s) may be end-capped with an acrylate moiety, such as hydroxyethyl acrylate. Examples of oligomers that may include the end-capped acrylate moiety are epoxy acrylates, polyester acrylates, polyether acrylates, polyether-urethane acrylates, polyester-urethane acrylates, or polyurethane acrylates.

Examples of suitable styrene monomer(s) and/or oligomer(s) include methylstyrene, ethylstyrene, tert-butylstyrene, 4-vinylstyrene, etc.

Polyurethane oligomers that may be used in the examples disclosed herein may be prepared utilizing an aliphatic diisocyanate, such as hexamethylene diisocyanate, cyclohexane diisocyanate, diisocyclohexylmethane diisocyanate, isophorone diisocyanate, or the like. In an example, polyester polyurethane may be prepared from adipic acid and neopentyl.

In still other examples, the monomer(s) or oligomer(s) may include both isocyanate and acrylate functionalities. Examples of these materials include CN966-H90, CN964, CN966, CN981, CN982, CN986, Pro1154 and CN301, all from Sartomer Co., Inc.

It is to be understood that any of the monomer(s) and/or oligomer(s) disclosed herein may be used alone or in combination with any of the other monomer(s) and/or oligomer(s) disclosed herein. The total amount of monomer(s) and/or oligomer(s) utilized in the mixture may range from about 5 wt % to about 90 wt % of the total wt % of the mixture. The total amount of cross-linking monomer(s) and/or oligomer(s) may range from about 5 wt % to about 80 wt %. In an example, the mixture may include from about 5 wt % to about 80 wt % of a 2-branch acrylate cross-linking monomer and from about 5 wt % to about 20 wt % of a 3-branch or a 4-branch cross-linking monomer.

The mixture may also include the initiator. It is to be understood that the initiator may be selected based upon the technique to subsequently be used to initiate cross-linking. As an example, if ultraviolet (UV) light is to be used to initiate cross-linking, the initiator may be a photoinitiator. Examples of suitable photoinitiators include 2,4,6-trimethyl-benzoyl-diphenylphosphine oxide (an example of which is LUCIRIN® TPO from BASF Corp.), 2,4,6-trimethyl-benzoylethoxyphenylphosphine oxide (an example of which is LUCIRIN® TPO-L from BASF Corp.), bis(2,4,6-trimethylbenzoyl)-phenyl-phosphine oxide (an example of which is IRGACURE® 819 from BASF Corp.), other acyl phosphines, 2-benzyl-2-dimethylamino-1-(4-morpholinophenyl)-butanone-1 (an example of which is IRGACURE 369 from BASF Corp.), titanocenes, benzophenone, 1-hydroxycyclohexyl phenyl ketone, isopropylthioxanthone (ITX), 2,4,6-trimethylbenzophenone, anisoin, benzil, camphorquinone, 4-methylbenzophenone, 2-methyl-1-(4-methylthio)phenyl-2-(4-morpholinyl)-1-propanone, diphenyl-(2,4,6-trimethylbenzoyl)phosphine oxide, 2,4,6-trimethylbenzoylphenylphosphinic acid ethyl ester, oligo-(2-hydroxy-2-methyl-1-(4-(1-methylvinyl)phenyl)propanone), 2-hydroxy-2-methyl-1-phenyl-1-propanone, benzyl dimethyl ketal (BDK), tert-butoxy-3,5,3-trimethylhexanoate, benzophenone, 1-hydroxycyclohexyl phenyl ketone, 2-benzyl-2-dimethylamino-4'-morph-olinophenyl)-butan-1-one, 2,2-dimethoxy-2-phenylacetophenone, and 2-methyl-1-[4-(methylthio)phenyl]-2-(4-morpholinyl)-1-propanone. Other suitable photoinitiators are amine synergists, such as, for example, ethyl-4-dimethylaminobenzoate and 2-ethylhexyl-4-dimethylamino benzoate. It is to be understood that the photoinitiator examples provided herein do not constitute an exhaustive list, and that any known photopolymerization initiator that initiates a free radical reaction upon exposure to a desired wavelength of radiation (such as UV light) may be used. Combinations of two or more of the photoinitiators may be utilized in some examples.

As another example, if heat is to be used to initiate cross-linking, the initiator may be a thermal initiator. Examples of suitable thermal initiators include organic peroxides, azo compounds, and inorganic peroxides. Some suitable organic peroxides include diacyl peroxide, peroxycarbonate, and peroxyester. In some examples, the organic peroxide may be a radical initiator such as isobutyl peroxide, lauroyl peroxide, stearyl peroxide, succinic acid peroxide, di-n-propyl peroxydicarbonate, diisopropyl peroxydicarbonate, or bis(4-tert-butylcyclohexyl)peroxy-dicarbonate. Examples of suitable azo compounds are azobisisobutyronitrile (AIBN) and azobis(cyclohexane-carbonitrile). Some suitable inorganic initiators may include ammonium persulfate, sodium persulfate, and potassium persulfate. Combinations of two or more of the thermal initiators may also be utilized in some examples.

The amount of the initiator included in mixture may range from about 1 wt % to about 10 wt % of the total wt % of the mixture.

The mixture may also include other additives that will not interfere with the desired cross-linking of the monomer(s) and/or oligomer(s). Examples of other suitable additives include accelerator components, curable adhesives, and/or nanoparticles.

The accelerator components may be any monomer that acts as a chain propagation accelerator. Examples of suitable accelerator components include nitrogen-containing monomers, such as acrylates or methacrylates substituted with dialkylamino groups, styrenes substituted with dialkylamino groups, and alkenes substituted with dialkylamino groups. Some specific examples may include N-vinylpyrrolidone, N,N-dimethylaminoethyl methacrylate, and N,N-dimethylaminoethyl acrylate. In some instances, the accelerator component may also serve as a hydrophilic monomer. A hydrophilic accelerator component may be desirable for wetting a substrate surface when applying the mixture, and for enhancing the adhesion of the mixture to the substrate surface.

Examples of suitable curable adhesives for the mixture include optical adhesives or electronic adhesives. Some suitable examples of curable adhesives are available from Norland Products, Cranbury N.J., and include NOA 60, NOA 61, NOA 63, NOA 65, NOA 68, NOA 68T, NOA 71, NOA 72, NOA 74, NOA 75, NOA 76, NOA 78, NOA 81, NOA83H, NOA 84, NOA 85, NOA 86, NOA 87, NOA 88, NOA 89, NOA 148 AND NOA 1625, NEA 121, NEA 123, NEA 123HGA, NEA 123 K, NEA 123L, NEA 123LHGA, NEA 123M, NEA 123S, NEA 123T, NEA 123THGA, NEA 123TKHGA, NEA 155, NCA 130, NBA 107, NBA 108.

As mentioned above, another suitable mixture additive is nanoparticles. Examples of suitable nanoparticles include silica nanoparticles, zinc oxide nanoparticles, and/or titanium oxide nanoparticles. The nanoparticle size ranges from about 1 nm to about 200 nm. These nanoparticles may be desirable in order to improve the thermal stability and/or photo stability of the resulting cross-linked polymer network. A suitable amount of nanoparticles that may be added to the mixture ranges from about 1 wt % to about 50 wt % of the total wt % of the mixture.

As shown at reference numeral 104 in FIG. 1, once the mixture is prepared, poling of the electro-optic chromophore 10 may be initiated by exposing the mixture to an electric field. In order to apply the electric field, a voltage is applied to two suitably positioned electrodes. A direct current (DC) electric field may be used. Exposure of the mixture to the electric field results in the polarization and conjugation of the electro-optic chromophore, and thus switches the electro-optic chromophore from the OFF state 10 to the ON state 10'. During poling, the permanent dipole moments of the electro-optic chromophores 10, 10' respond to align with the poling field (i.e., the electric field), resulting in unidirectional molecular order. Since the mixture is in liquid form (i.e., solution or dispersion) and the monomer(s) and/or oligomer(s) do not need to be melted, poling may be accomplished at an ambient temperature (i.e., room temperature, ranging from about 20° C. to about 25° C.). As such, in the examples disclosed herein, the poling of electro-optic chromophore may take place without first heating the mixture.

As shown at reference numeral 106 in FIG. 1, while poling takes place, the mixture is also subjected to ultraviolet light (UV) or heat. The external UV light or heat stimulus initiates the cross-linking of at least the cross-linkable monomer(s) and/or cross-linkable oligomer(s) present in the mixture. It is to be understood that cross-linking is not accomplished prior to poling. The external UV light or heat stimulus also initiates polymerization of the monomer(s) and/or oligomer(s) in the mixture to form the cross-linked polymer matrix.

UV light exposure or heat exposure may be accomplished until the curable materials (e.g., the monomer(s), oligomer(s), additive(s), etc.) within the mixture are fully cured and the cross-linked polymer matrix is formed. UV light exposure may be performed using any suitable UV light source, including a UV lamp. Example UV light sources include RC-250 from Xenon Corp., Wilmington, Mass.; Opticure 4 Light Gun from Norland Products, Cranbury, N.J.; Portascan 100 from American Ultraviolet, Chatham, N.J.; and SB-100P Mercury* Spot Lamp from Spectronics Corp., Westbury, N.Y. Exposure to the UV light may be accomplished for a time period ranging from about 1 minute to about 10 minutes, depending, at least in part, on the UV curable materials that are utilized. UV light exposure may take place at ambient (i.e., room) temperatures. Heat exposure may be performed using any suitable heat source, including an oven, a heat lamp, IR lamp, IR oven, etc. Exposure to heat may be accomplished for a time period ranging from about 30 minutes to about 5 hours, depending, at least in part, on the thermally curable materials that are utilized. The temperature for heating will also depend, at least in part, on the thermally curable materials that are utilized. In an example, the temperature used for curing ranges from about 70° C. to about 150° C.

The cross-linked polymer matrix that forms upon the completion of UV light exposure or heat exposure is inert and optically transparent.

Poling results in the self-alignment and the polarization of the electro-optic chromophores 10' within the mixture. UV exposure or heat exposure results in the formation of the cross-linked polymer matrix from the mixture. Since poling is accomplished alone, and then poling is continued and accomplished simultaneously with UV or heat exposure, the process described in FIG. 1 results in the aligned, polarized electro-optic chromophores 10' becoming distributed throughout and fixed within the cured cross-linked polymer matrix, thereby forming the cross-linked polymer network. This process seals the polarized electro-optic chromophores 10' within the cross-linked polymer matrix without the use of hermetic sealing. It is believed that the polymer matrix is relatively robust (due to the cross-linked nature of the matrix), and protects the polarized electro-optic chromophores 10' from oxygen and ozone oxidation as well as from moisture degradation.

Since curing actually fixes the polarized electro-optic chromophores 10' within the solidified matrix, it is to be understood that after full curing is achieved, both the UV light or heat and the electric field used for poling may be removed. In instances when heat is used for curing, this means that the electric field does not need to be applied to hold the polarized electro-optic chromophores 10' in place while the cross-linked polymer network cools. This may be particularly advantageous because special cooling equipment for performing cooling in the presence of an electric field is not needed. Additionally, the removal of the electric field prior to cooling reduces the amount of time that the electro-optic chromophore(s) is/are under high voltage, and thus may increase the stability of the resulting cross-linked polymer network.

Figure 6:
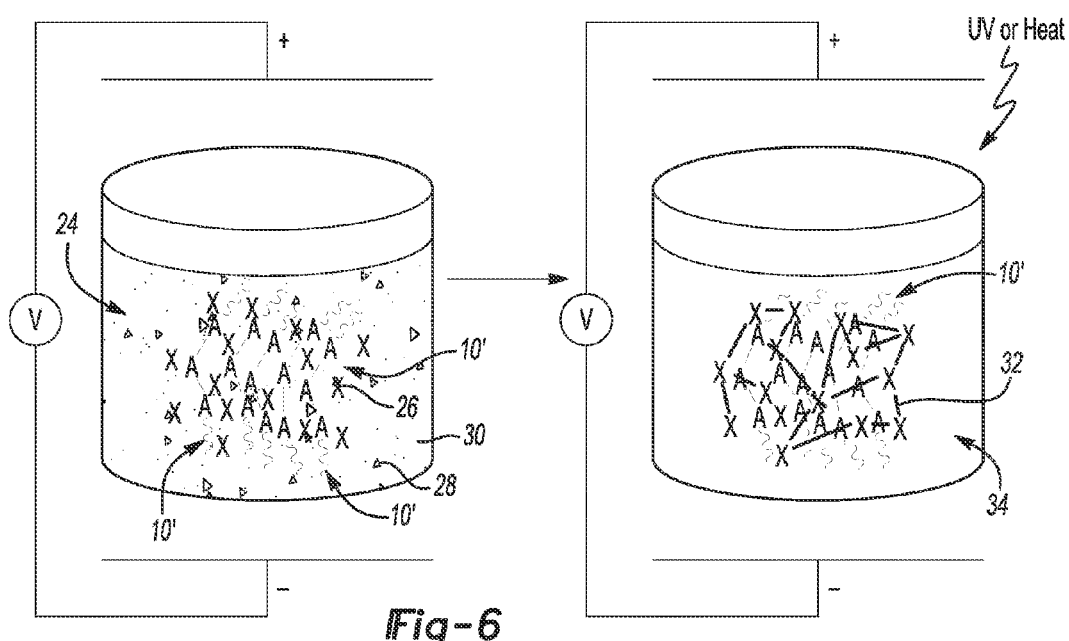
FIG. 6 is a schematic illustration depicting an example of a mixture of an electro-optic chromophore and a cross-linkable monomer or oligomer before and after exposure to ultraviolet light or heat.

Referring now to FIG. 6, a schematic illustration of poling is depicted on the left-hand side of the arrow, and then a schematic illustration of poling along with UV or heat exposure is depicted on the right-hand side of the arrow. In FIG. 6, the mixture 24 includes the electro-optic chromophores (shown as 10'), the cross-linkable monomer(s) and/or oligomer(s) 26 (depicted as "X"), the initiator 28, and the solvent 30.

On the left-hand side of the arrow in FIG. 6, poling of the mixture 24 has been initiated. In this illustration, the electro-optic chromophores 10' are shown schematically with repeat units A and fragments, but the state/conjugation of the chromophores is not actually depicted. Since poling has been initiated, it is to be understood that at least some of the chromophores 10' are fully conjugated, polarized, and in the ON state. Poling is continued so that all of the chromophores 10' are fully conjugated, polarized, and in the ON state. During poling, the chromophores 10' also align throughout the mixture 24 as previously described.

On the right-hand side of the arrow in FIG. 6, the mixture 24 is exposed to UV light or heat while poling continues. As discussed above, UV light or heat results in the cross-linking of any cross-linkable materials X present in the mixture 24, polymerization of any polymerizable materials present in the mixture 24, and curing of the curable materials present in the mixture 24. As such, UV light or heat exposure results in the formation of the cross-linked polymer network 34, which includes the cross-linked polymer matrix 32 having the polarized electro-optic chromophores 10' embedded therein.

Figure 7:
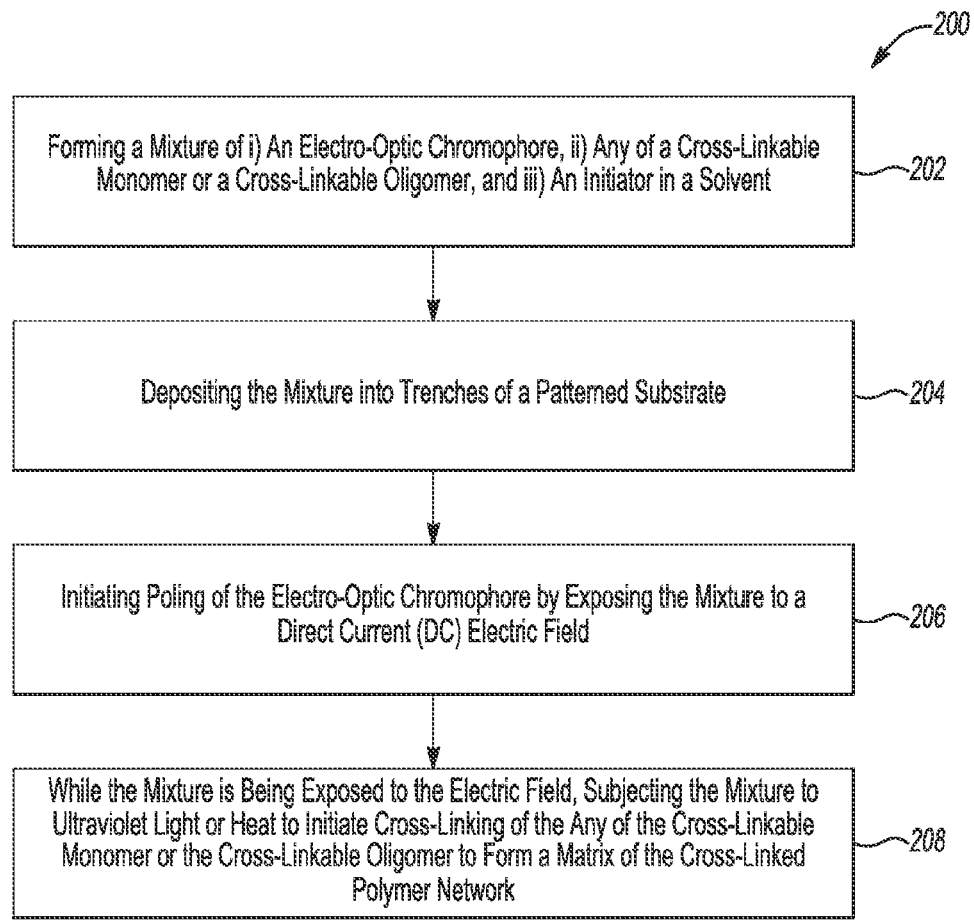
FIG. 7 is a flow diagram depicting an example of a method for making an electro-optic device.
Figure 8:
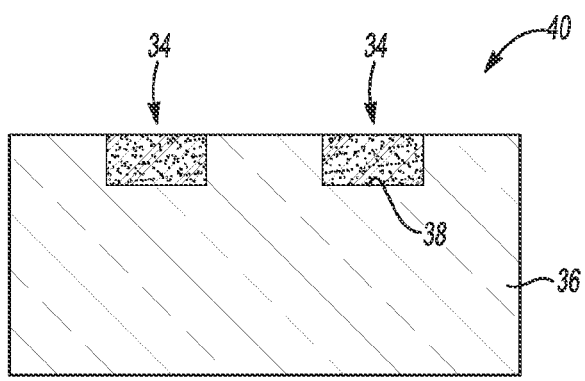
FIG. 8 a cross-sectional view of a portion of an electro-optic device.

Referring now to FIG. 7, an example of a method for making an electro-optic device is depicted. The method is shown generally at reference numeral 200. FIG. 8 depicts a schematic, cross-sectional view of an example of the electro-optical device 40 that may be formed via the method 200. As such, FIGS. 7 and 8 will now be discussed together.

The method 200 includes forming the mixture of i) the electro-optic chromophore, ii) any of the cross-linkable monomer or the cross-linkable oligomer, and iii) the initiator in the solvent, as shown at reference numeral 202 in FIG. 7. The mixture in this example of the method 200 may be formed using the materials and methods previously described herein.

The method 200 further includes depositing the mixture into trenches 38 of a patterned substrate 36. The depositing step is shown at reference numeral 204 in FIG. 7. Depositing of the mixture may be accomplished via spin coating, spray coating, dip coating, etc. In other examples of the method, the mixture may be deposited onto a relatively flat surface of a substrate, as opposed to being deposited in trenches 38 that are formed in the substrate 36.

The substrate 36 may be a silicon wafer or any other suitable substrate. The trenches 38 may be patterned into a surface of the substrate 36 using any suitable method including embossing, etching (e.g., deep reactive ion etching), nano-imprinting, focused ion-beam, e-beam lithography, or optical lithography. The trenches 38 may have any desirable pattern, including a straight, zigzag, curved, serpentine, or other suitable pattern.

After the mixture is deposited into the trenches 38 (or in other examples on the substrate surface), poling of the electro-optic chromophore 10 in the deposited mixture may be initiated by exposing the deposited mixture to a direct current (DC) electric field. This step is shown at reference numeral 206 in FIG. 7. While the deposited mixture is being exposed to the electric field, the method 200 further includes subjecting the deposited mixture to ultraviolet light or heat to initiate cross-linking and to form the matrix of the cross-linked polymer network. This step is shown at reference numeral 208 in FIG. 7. Both steps 206 and 208 of the method 200 may be performed as previously described herein.

The electro-optical device 40 formed via the method 200 shown in FIG. 7 includes the cross-linked polymer network 34 formed in each of the trenches 38, as shown in FIG. 8.

It is to be understood that the ranges provided herein include the stated range and any value or sub-range within the stated range. For example, a range from about 1 wt % to about 50 wt % should be interpreted to include not only the explicitly recited limits of about 1 wt % to about 50 wt %, but also to include individual values, such as 5 wt %, 20 wt %, 30.5 wt %, etc., and sub-ranges, such as from about 2 wt % to about 40 wt %, from about 5 wt % to about 20 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for making a cross-linked polymer network, comprising:
    forming a mixture of i) an electro-optic chromophore, ii) any of a cross-linkable monomer or a cross-linkable oligomer, and iii) an initiator in a solvent;
    initiating poling of the electro-optic chromophore by exposing the mixture to an electric field; and
    while the mixture is being exposed to the electric field, subjecting the mixture to ultraviolet light or heat to initiate cross-linking of the any of the cross-linkable monomer or the cross-linkable oligomer to form a matrix of the cross-linked polymer network.

2. The method as defined in claim 1, further comprising selecting the electro-optic chromophore from a group of electro-optic chromophores without a polymerizable functional group.

3. The method as defined in claim 1, further comprising depositing the mixture on a substrate prior to performing the exposing and the subjecting.

4. The method as defined in claim 1, further comprising adding any of an accelerator component, or a curable adhesive, or a nanoparticle to the mixture prior to the exposing and to the subjecting.

5. The method as defined in claim 1 wherein the mixture includes:
    from about 1 wt % to about 50 wt % of the electro-optic chromophore;
    from about 20 wt % to about 80 wt % of a two-branch acrylate cross-linkable monomer;
    from about 5 wt % to about 20 wt % of a three-branch or four-branch cross-linkable monomer;
    from about 1 wt % to about 10 wt % of the initiator;
    from about 5 wt % to about 20 wt % of a nitrogen-containing monomer accelerator component; and
    a balance of the solvent.

6. A cross-linked polymer network formed by the method of claim 1.

7. The cross-linked polymer network as defined in claim 6 wherein the electro-optic chromophore is uniformly distributed inside of the matrix.

8. The method as defined in claim 1 wherein:
    the subjecting of the mixture to ultraviolet light or heat initiates curing of the matrix; and
    the subjecting of the mixture to ultraviolet light or heat is accomplished until the matrix is fully cured.

9. The method as defined in claim 8 wherein the mixture is subjected to the heat, and wherein the method further comprises removing the electric field as the cross-linked polymer network cools.

10. The method as defined in claim 8 wherein the mixture is subjected to the ultraviolet light, and wherein the method further comprising performing the subjecting at an ambient temperature.

11. A method for making an electro-optic device, comprising:
    forming a mixture of i) an electro-optic chromophore, ii) any of a cross-linkable monomer or a cross-linkable oligomer, and iii) an initiator in a solvent;
    depositing the mixture into trenches of a patterned substrate;
    initiating poling of the electro-optic chromophore by exposing the mixture to a direct current (DC) electric field; and
    while the mixture is being exposed to the electric field, subjecting the mixture to ultraviolet light or heat to initiate cross-linking of the any of the cross-linkable monomer or the cross-linkable oligomer to form a matrix of a cross-linked polymer network.

12. The method as defined in claim 11, further comprising selecting the electro-optic chromophore from a group of electro-optic chromophores without a polymerizable functional group.

13. The method as defined in claim 11, further comprising adding any of an accelerator component, or a curable adhesive, or a nanoparticle to the mixture.

14. The method as defined in claim 11 wherein:
    the mixture is a liquid; and
    the poling of the electro-optic chromophore is accomplished at an ambient temperature.

15. The method as defined in claim 11 wherein:
    the subjecting of the mixture to ultraviolet light or heat initiates curing of the matrix; and
    the subjecting of the mixture to ultraviolet light or heat is accomplished until the matrix is fully cured.

16. The method as defined in claim 15 wherein the mixture is subjected to the heat, and wherein the method further comprises removing the electric field as the cross-linked polymer network cools.

17. The method as defined in claim 15 wherein the mixture is subjected to the ultraviolet light, and wherein the method further comprises performing the subjecting at an ambient temperature.

18. An electro-optic device, comprising:
    a silicon substrate;
    a trench patterned into a surface of the silicon substrate;
    a cross-linked polymer network formed in-situ within the trench, the cross-linked polymer network including:
        a cured cross-linked polymer matrix; and
        a polarized electro-optic chromophore uniformly distributed throughout the cured cross-linked polymer matrix and immersed within the cured cross-linked polymer matrix.

* * * * *